United States Patent [19]
White

[11] Patent Number: 4,782,652
[45] Date of Patent: Nov. 8, 1988

[54] ROUND BALER HAVING ANTI-PLUGGING MEANS

[75] Inventor: Bruce L. White, North Newton, Kans.

[73] Assignee: Hay and Forage Corporation, Hesston, Kans.

[21] Appl. No.: 102,099

[22] Filed: Sep. 29, 1987

[51] Int. Cl.$^4$ .............................................. A01D 39/00
[52] U.S. Cl. ........................................ 56/341; 100/88; 100/89
[58] Field of Search ......................... 56/341, 342, 343; 100/88, 89

[56] References Cited

U.S. PATENT DOCUMENTS

| | | | |
|---|---|---|---|
| 4,172,354 | 10/1979 | Vermeer et al. | 56/341 |
| 4,182,101 | 1/1980 | Gaeddert et al. | 100/88 |
| 4,224,867 | 9/1980 | Gaeddert et al. | 100/88 |
| 4,510,741 | 4/1985 | Campbell et al. | 56/341 |

Primary Examiner—Robert E. Garrett
Assistant Examiner—Therese Newholm
Attorney, Agent, or Firm—Hovey, Williams, Timmons & Collins

[57] ABSTRACT

The baler has an internal chamber within which crop materials are coiled up into a cylindrical bale by fore-and-aft spaced-apart, oppositely moving web stretches, the forwardmost stretch of which is looped around a forward drive roll. A special bale supporting roller adjacent the bottom of the chamber keeps the bale from riding against the web wrapped around the forward roll. The support roll includes a cylindrical shaft and a plurality of resilient flaps extending tangetially outward from the periphery of the shaft. During baler operation, crop material tends to be carried downwardly by the forwardmost stretch into a zone located between the forward roll and the support roller, but is immediately ejected from the zone by the roller flaps and into the baling chamber, thereby preventing crop materials from wedging between the forward roll and the support roller. When the flaps are brought into contact with the bale, they yield to its weight, conforming to the periphery of the shaft, thereby forming a relatively smooth, circular roller surface for supporting the bale without tearing up the exterior thereof.

7 Claims, 1 Drawing Sheet

U.S. Patent  Nov. 8, 1988  4,782,652
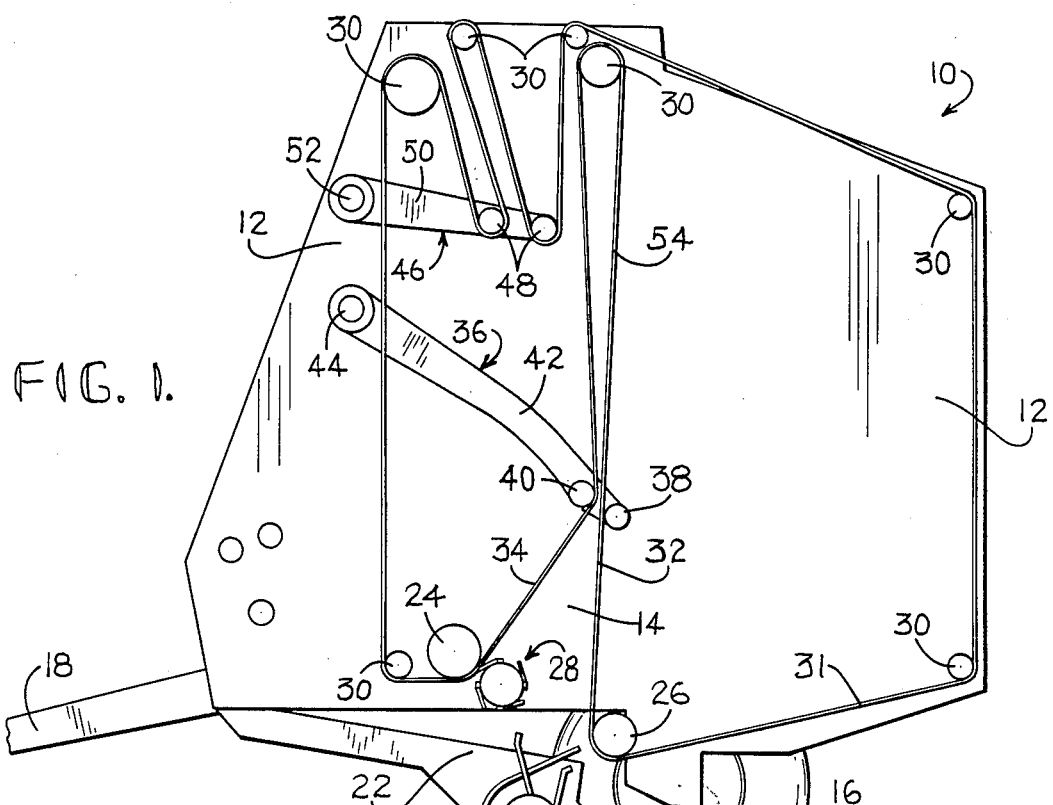
FIG. 1.
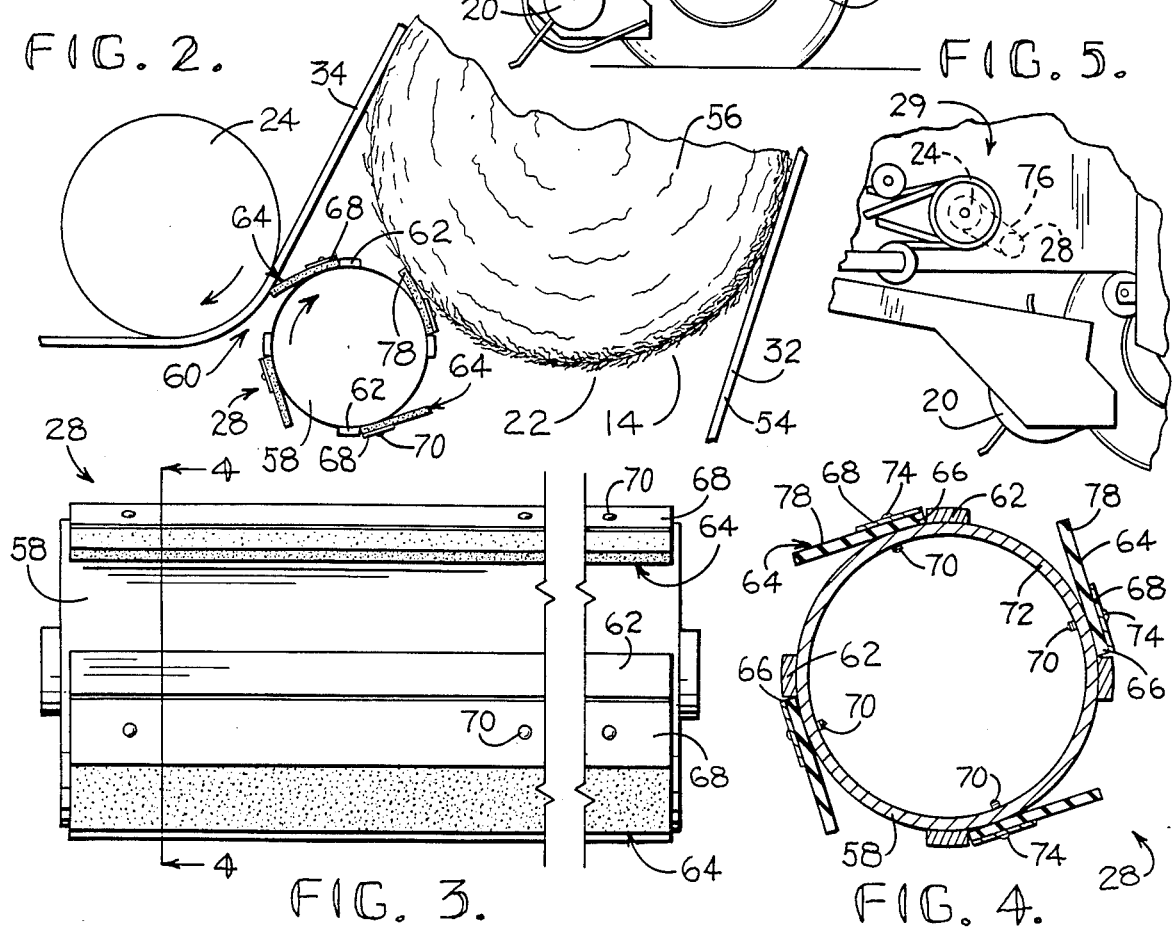
FIG. 2.
FIG. 5.
FIG. 3.
FIG. 4.

ROUND BALER HAVING ANTI-PLUGGING MEANS

BACKGROUND OF THE INVENTION

1. Field of the Invention

This invention relates to rotary crop balers and, more particularly, to improvements in such balers with respect to avoidance of accumulations of crop materials in undesired locations.

2. Description of the Prior Art

Various balers have been developed which incorporate a support roll adjacent the bottom of the baling chamber for keeping the bale from riding against the web of belts wrapped around a forward roll. Such support rolls have either been smooth or as disclosed in U.S. Pat. No. 4,182,101, have had rigid undulations along the length thereof. During bale formation, crop material often tends to be sloughed off the bale and driven between the support roll and the forward roll by an aggressively driven downward stretch of web. Accumulation of crop material in this zone between the rollers can lead to binding therebetween creating substantial frictional forces and either damaging the belts or effectively shutting down the machine.

SUMMARY OF THE INVENTION

Accordingly, the present invention provides a baler having an anti-plugging support roller designed to meet the aforementioned needs and to overcome the aforementioned shortcomings of the prior practices. The support roller includes an elongated, cylindrical shaft and a plurality of resilient flaps which extend tangentially outward from the periphery of the shaft. During operation of the baler, the roller rotates, moving its flaps through the zone between the support roller and the forward roll, thereby ejecting crop materials from the zone and back into the baling chamber. The flaps extend across the zone and wipe the web passing between the roll and the roller. As the roller supports the bale, the outwardly extending flaps engage the periphery of the bale, yielding thereto and conforming with the periphery of the shaft so as to provide a substantially circular, smoothly curved, gentle roller surface for supporting the periphery of the bale without damage thereto.

BRIEF DESCRIPTION OF THE DRAWINGS

FIG. 1 is a side elevational view of a rotary baler incorporating the anti-plugging roller of the present invention, the near sidewall of the baler being removed to reveal details of construction;

FIG. 2 is an enlarged, fragmentary view of a bale, a forward roll, and an anti-plugging roller;

FIG. 3 is an enlarged, fragmentary front view of the anti-plugging roller;

FIG. 4 is an enlarged, vertical crosssectional view of the anti-plugging roller taken substantially along line 4—4 of FIG. 3; and FIG. 5 is a fragmentary side elevational view of the baler and showing drive belts for the forward roll and the anti-plugging roller.

DETAILED DESCRIPTION

Referring now to FIG. 1, the baler 10 has a pair of laterally spaced-apart sidewalls 12 (only one being shown) that cooperate to provide the lateral extremities of a bale forming chamber denoted broadly by the numeral 14. The sidewalls 12 are carried on a suitable chasis which is in turn carried by a pair of ground wheels 16 located on opposite sides of the baler 10 outboard of the respective sidewalls 12. A fore-and-aft extending tongue 18 located adjacent the front end of the baler 10 relative to its normal direction of travel adapts the same to be hitched behind a towing tractor or the like for advancement across a field having windrowed crop material deposited thereon. A pickup 20 spaced rearwardly from the front extremity of the sidewalls 12 and located substantially directly beneath the chamber 14 is operable to pick up windrowed material from the field as the baler 10 passes over the same and to feed such material up into the chamber 14 through an entrance 22 defined between transversely extending forward roll 24 and shaft 26 spanning the sidewalls 12 and located in fore-and-aft spaced relationship to one another. An anti-plugging roller 28 spanning sidewalls 12 and situated rearwardly adjacent the front roll 24 keeps the bale off roll 24 during formation.

Also spanning the sidewalls 12 are additional shafts arranged in a generally circular pattern progressing in a counterclockwise direction from the shaft 26, said shafts being identified by the numerals 30. The shafts 30 are all idler shafts, while the roll 24 is rotatively driven in a clockwise direction viewing FIGS. 1 and 2 by belt and pulley mechanism 31 illustrated in FIG. 5.

The bale chamber 14 is further defined by structure in the form of an endless, flexible web broadly denoted by the numeral 31 which is looped over and under the various shafts in such a manner as to present a pair of generally upright, opposed web stretches 32 and 34 which initially move in opposite, generally vertical directions, stretch 32 moving upwardly and stretch 34 moving downwardly. The web stretches 32, 34 are held apart at their lower ends by the roll 24 and the shaft 26 such as to present the entrance 22, and the stretches 32, 34 are held close together at a location above the entrance 22 by a retaining device 36 in the nature of a pair of elongated, fore-and-aft spaced-apart shafts 38, 40 extending laterally across the width of the baler and rotatively mounted on and extending laterally between a pair of arms 42 (only one being shown). The pair of arms 42 are attached to respective sidewalls 12 and are pivotally mounted onto the sidewalls along a common pivot axis 44 and are biased downwardly about that axis 44 by a mechanism not shown but readily understood by those skilled in the art.

A tensioning device 46 maintains the web taut during bale formation and includes a pair of shafts 48 having web 31 looped thereunder. The shafts 48 are spaced fore-and-aft and are rotatably mounted between a pair of laterally spaced-apart tensioning arms 50 which are mounted to respective sidewalls 12 along aligned pivots 52 (only one being shown) and are biased downward, as viewed in FIG. 1, for maintaining the web taut. The web 31 preferably takes the form of a series of endless, identical belts 54 spaced a short distance apart across the baler 10 and between the sidewalls 12.

The anti-plugging roller 28 is located within entrance 22 adjacent roll 24 and spaced slightly rearwardly and below roll 24. As shown in FIG. 2, roller 28 supports the lower periphery of a bale 56 during formation thereof. Roller 28 includes a shaft 58 rotatably mounted on and extending laterally between sidewalls 12. Web stretch 34 passes between roller 28 and roll 24 and is aggressively driven downwardly by roll 24 thus forcibly rotating the forming bale 56 and sometimes carrying crop materials into a zone 60 generally located between roll 24 and roller 28.

As can be seen in FIGS. 2, 3, and 4, four elongated ribs 62 are affixed to the periphery of the shaft 58 along the length thereof and are equally spaced about the circumference of the shaft 58. Four elongated, resilient, anti-plugging flaps 64 extend along the length of shaft 58 and are mounted at their leading edges 66 directly behind respective ribs 62. Each leading edge 66 is overlapped by a narrow, metallic support strip 68 which receives screws 70 that extend through the flap 62 and thread into an outer tubular wall 72 of shaft 58. Once the screws 66 are tightly screwed into the shaft 58, screw heads 74 bear against each strip 68 thereby holding flaps 64 firmly against the shaft 58 and effectively preventing the flaps 64 from tearing away from the screws 70.

The somewhat stiff yet resilient nature of the flaps 64 permits them to normally extend tangentially outward from the periphery of the shaft 58 while at the same time permitting the flaps 64 to be forced by the bale during support thereof into a curved shaped conforming with the circumference of the shaft 58. As illustrated in FIG. 2, the flaps 64 normally extend sufficiently far enough away from the periphery of the shaft 58 so as to extend across the zone 60 and engage the web stretch 34 adjacent the roll 24.

It has been found that the rubber belt material commonly used by farm equipment manufacturers in connection with the forming belts on their round balers is quite suitable as a material from which the flaps 64 can be made. This, of course, corresponds to the belt material used in connection with the web 31 on the baler 10 of the present invention. Preferably, the material used for the flaps 64 has an aggressive surface contour presented by ribs in a chevron pattern or otherwise arranged to provide irregularities on the contour. The belting material from which the flaps 64 are preferably made is well known to those skilled in the art and is readily available from a variety of commercial sources.

OPERATION

When the bale chamber 14 is empty, such as at the beginning of the baling cycle, the components of the baler 10 are disposed in the condition illustrated by FIG. 1. At such time, the retaining device 36 is in its closest position to the lower shafts so as to maintain the chamber at its smallest size.

As the baler 10 advances along a crop windrow, pick-up 20 lifts the materials off the ground and feeds it through the entrance 22 into the chamber 14 whereupon it is acted upon by the oppositely moving, generally vertically directed belt stretches 32, 34 so as to cause the introduced material to tumble forwardly. As additional material is thus introduced into the chamber 14, the tumbling material begins to coil up into a bale and exert radially outwardly directed forces against the belt stretches 32, 34 and against the shafts 38, 40 of retaining device 36. The outward movement of the belt stretches 32, 34 and upward movement of the retaining device 36 is, of course, resisted by the tension springs (not shown) which bias the arm 42 downwardly about pivot axis 44.

As the bale 56 begins to form, it rotates in a generally counterclockwise direction viewing FIG. 2 and is supported by anti-plugging roller 28 which is driven in a clockwise direction by a drive belt and pulley mechanism 76 (illustrated in phantom FIG. 5) which takes power from driven roll 24. Roll 24 is driven in a clockwise direction as illustrated in FIG. 2, thereby driving the web 30, and more particularly, driving the web stretch 34 aggressively downwardly between the roll 24 and the roller 28. As the web stretch 34 travels from the baling chamber 14 into zone 60 it tends to carry crop materials with it.

However, anti-plugging roller 28 prevents the zone 60 from being plugged with crop material by employing the flaps 64 which, during rotation of the roller 28, pass upwardly through the zone, wiping the stretch 34 adjacent the roll 24 free of crop materials, and forcing crop materials from zone 60 back into baling chamber 14.

As the tips of flaps 64 engage the web stretch 34, the flaps 64 yield slightly, thus preventing substantial wear between the flaps and the web.

During bale formation, the roller 28 supports the bale 56 and rotates therewith, bringing the ribs 62, the strips 68, and the flaps 64 into supportive engagement with the underside of the bale 56. The bale rides on top of the ribs 62 and support strips and is supported thereby. As the bale engages an outwardly extending portion 78 of the the flap 62, the weight of the bale forces the resilient flap 62 to bend until the flap 62 conforms with the curvature of the circumference of the shaft 58. The entire width of the flap 62 is then supported by the periphery of the shaft 58 thereby forming a substantially continuous, circular surface of engagement, for supporting the bale 56 without distrubance of the bale periphery while at the same time providing projections 62 which extend outwardly from the shaft 58 for clearing the zone 60 of crop materials, thereby preventing plugging of the zone 60 and binding of the web 31 between the roll 24 and the roller 28.

I claim:

1. In a baler for forming large round bales of fibrous crop material, wherein the bale is formed off the ground above a transverse roll that has a web stretch looped below the same, said web stretch normally engaging the periphery of the bale during said rolling thereof and being driven in a direction that causes the stretch to move generally from the bale toward the roll, a bale supporting roller adjacent the side of the roll receiving the stretch from the bale and located in disposition to engage the lower periphery of the rolling bale and bear the weight thereof otherwise borne by said roll and said web stretch as it moves around said roll, said support roller including a shaft extending across the machine in parallelism with said roll and mounted for rotation about its own longitudinal axis, means for rotating said roller in the same direction as said roll, said roll and roller being spaced-apart and generally defining a zone therebetween, the improvement comprising:

a resilient flap extending outwardly from said roller shaft and along the length thereof, said flap passing through said zone as said roller rotates thereby removing crop materials from said zone, said resilient flap yielding to said bale when brought into contact with the bale during the rotation of the support roller.

2. In the improvement of claim 1, said roller shaft being generally cylindrical in shape, said flap extending tangentially outwardly from the periphery of said shaft and in a direction opposite the direction of rotation of the roller.

3. In the improvement of claim 2, said roller further comprising a rib extending along the length of the shaft and fixed to the periphery thereof, said flap being located directly behind said rib, said rib providing structural protection for said flap during rotation of said roller.

4. In the improvement of claim 3, said roller including a plurality of flaps and corresponding protective ribs, said ribs being circumferentially spaced about the periphery of said roller.

5. In the improvement of claim 4, said ribs being equally spaced about the periphery of said roller.

6. In the improvement of claim 1, said flap being disposed for engaging said web when said flap passes through said zone.

7. In the improvement of claim 2, said flap being sufficiently resilient to conform to the periphery of said shaft for forming a generally smooth, circular roller surface during support of the bale.

* * * * *